May 8, 1951

C. O. ERICKSON 2,552,371

MOTORCYCLE FOOT PEDAL OPERATED
TRANSMISSION CONTROL

Filed Aug. 5, 1948

INVENTOR.
Carl O. Erickson
BY
Wilfred Larison
Attorney

May 8, 1951
C. O. ERICKSON
MOTORCYCLE FOOT PEDAL OPERATED
TRANSMISSION CONTROL
2,552,371
Filed Aug. 5, 1948
2 Sheets-Sheet 2
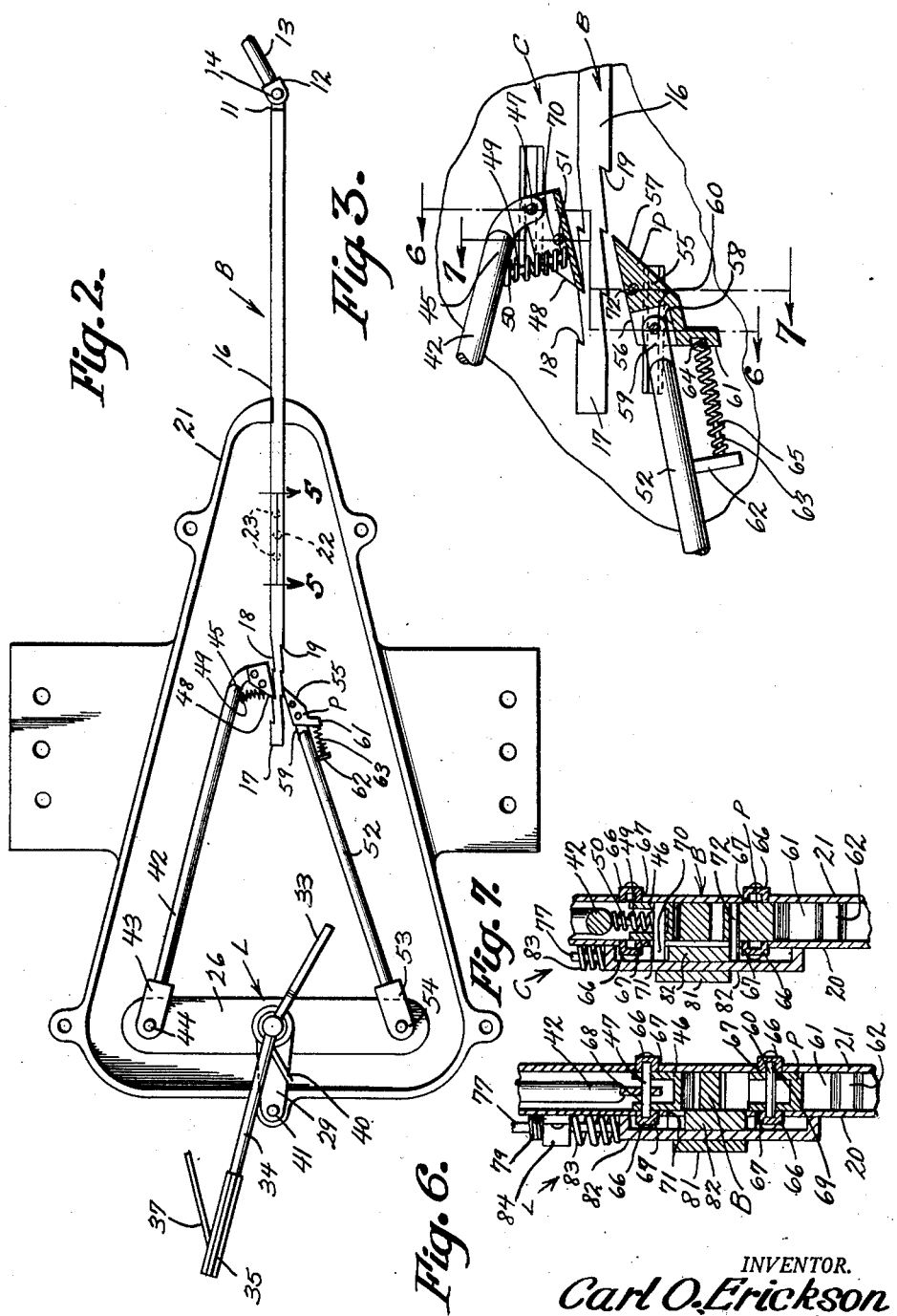
INVENTOR.
Carl O. Erickson
BY
Wilfred G. Lawson
Attorney Patented May 8, 1951

2,552,371

UNITED STATES PATENT OFFICE 2,552,371

MOTORCYCLE FOOT PEDAL OPERATED TRANSMISSION CONTROL

Carl O. Erickson, Hollywood, Calif.

Application August 5, 1948, Serial No. 42,710

4 Claims. (Cl. 192—3.5)

1

The invention relates to improvements in clutch controlling and gear shifting mechanisms for motorcycles and the like and an object of the invention is to provide a mechanism of the character indicated above adapted to disengage the clutch automatically, whenever the gears are shifted from first to second speed and so forth.

Another object of the invention is to provide a mechanism of the character indicated above, wherein the gear shifting means are arranged into position to shift the gears into a desired position, whenever the clutch is thrown in.

A further object of the invention is to provide a mechanism of the character indicated above, which is adapted to be incorporated in and attached as one assembled unit to any standard motorcycle without requiring changes and alterations involving special machine work or additional parts, with the exception of disconnecting the conventional clutch controlling and gear shifting means and inserting and connecting the assembly of the new mechanism.

Other objects of the invention not specifically mentioned may appear in the following specification describing it with reference to the accompanying drawing illustrating a preferred embodiment of the invention. It is, however, to be understood that the invention is not to be restricted or limited to the exact construction and combination of parts described in the specification and shown in the drawing, but that such changes and modifications can be made, which fall within the scope of the claims appended hereto.

In the several figures of the drawing similar parts are indicated by similar reference characters, and Figure 1 is a view in side elevation of the mechanism for controlling the clutch and shifting the gears of a motor cycle in accordance with the invention and showing a casing in which a part thereof is enclosed.

Figure 2 is a view of the mechanism and opened casing therefor;

Figure 3 is a detail view on an enlarged scale of the gear shifting bar and pawls;

Figure 6 is a sectional view taken on line 6—6 of Figure 3.

Figure 7 is a sectional view taken on line 7—7 of Figure 3;

2

Figure 1:
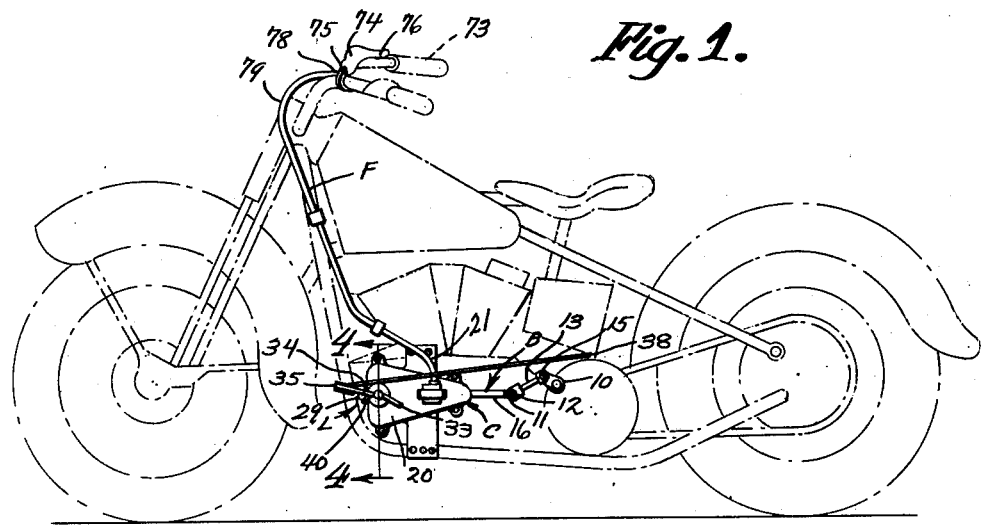
Figure 4:
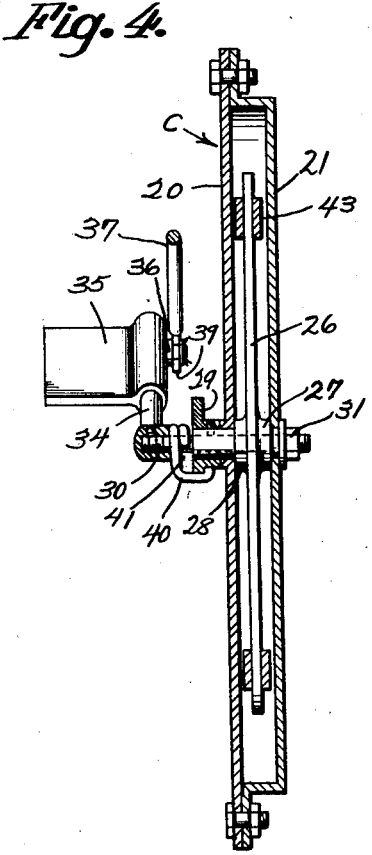
Figure 4 is a sectional view on an enlarged scale taken on line 4—4 of Figure 1.
Figure 5:
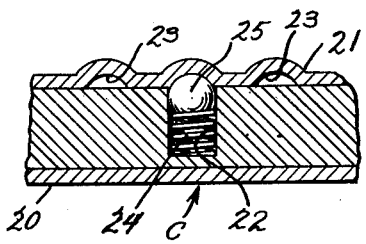
Figure 5 is a sectional view on an enlarged scale taken on line 5—5 of Figure 2.
Figure 8:
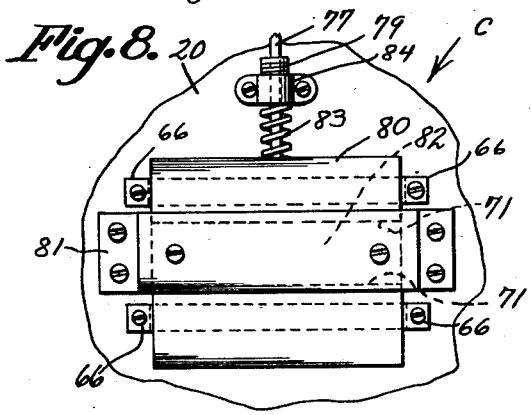
Figure 8 is a fragmentary view in elevation of the outer casing showing the pawl control.

The mechanism for controlling and actuating the clutch and for operating the gear shifting cam embodied herein comprises an outer casing C adapted to be mounted by any preferred conventional means to the frame of a motorcycle, which is equipped with a conventional gear transmission adapted to be operated or shifted by means of a gear shifting cam 10. A gear shifting bar B has preferably a quadrangular cross section and is provided with a rear portion 11 of reduced thickness, to which the bifurcated front end portion 12 of a connecting rod 13 is pivotally secured by a pivot pin 14. The rear end portion 15 of the connecting rod 13 is pivotally connected with the outer or free end of the gear shifting cam 10. The main portion 16 of the gear shifting bar B extends forwardly from its rear portion 11, and the forward gear shifting bar portion 17 is provided on its upper surface with a plurality of rearwardly pointing ratchet teeth 18 and on its lower surface with a plurality of forwardly pointing ratchet teeth 19. The gear shifting bar B is slidably arranged between the outside wall 20 and the inside wall 21 of the outer casing C. The main portion 16 of said bar is provided adjacent its forward end with a blind hole 22 located in the side thereof adjacent the inside casing wall 21. A plurality of partly globular dents or sockets 23 are arranged in the inside casing wall 20 so that the blind hole 22 and the dents 23 are located at the same level. A helical spring 24 is arranged in the blind hole 22 and urges a ball 25 into contact with the inside casing wall 20 so that said ball will engage selectively the several partly globular dents 23, which are spaced from each other at a distance equal to the distance which the gear shifting bar B is moved, when shifting the transmission from one speed to the next. In this manner the shifting bar B is secured against accidental lengthwise movement in the casing C.

A flat gear shifting lever 26 is provided intermediate its ends on both sides with coaxial sleeves 27 and 28 respectively and the bores of these sleeves extend through the flat lever so that the sleeves form a bearing for a purpose to be described later. The flat lever 26 is located inside the casing C and the sleeve 28 extends pivotally through the outside wall 20 of said casing while the sleeve 27 aligns with an opening formed through the inside casing wall 21. The sleeve 28 protrudes outside of the outside casing wall 20 and a lever arm 29 is rigidly mounted on the sleeve portion protruding beyond said casing wall. A shaft 30 is rotatably positioned in the bearing formed by the two sleeves 27 and 28 and extends beyond this bearing. The shaft portion extending beyond the inner sleeve 27 is adapted to be provided with means for retaining the shaft 30 in the bearing. In the embodiment of the mechanism shown in the drawing such means is indicated as a retaining nut 31. It is, however, to be understood that any other suitable retaining means can be used. The other end portion of the shaft 30 extends beyond the outside sleeve 28 and on the outside end portion of the shaft 30 a lever bar L is formed or rigidly mounted so that it extends a comparatively short distance rearwardly from the shaft 30 and a comparatively long distance forwardly from said shaft. On the rear end portion 32 of said bar a rear pedal 33 is formed and on the front end portion 34 a pedal 35 is securely mounted or integrally formed therewith and extends outwardly at right angles therefrom. A pivot pin 36 projects inwardly at right angles from the bar portion 34 and is located adjacent to the forward end thereof. A clutch operating rod 37 is connected at its rear end with the clutch lever 38 and is provided on its front end portion with an eye 39 adapted to receive the pivot pin 36 oscillatingly therein. A coil spring 40 is mounted on the outside end portion of the shaft 30 between the outside end of the outside sleeve 28 and the lever bar L. The rear end portion of the coil spring is secured to the shaft 30 and the forward end of it is attached to the lever arm 29 for a purpose to be described later. A pin 41 extends outwardly from the front end portion of the lever arm 29 and is located underneath the portion 34 of the lever bar L, so that the latter engages said pin, when the bar is swung downwardly.

An upper pawl bar 42 has a bifurcated front end portion 43, which straddles the upper end portion of the gear shifting lever 26 and is pivotally connected with this lever portion by means of a pivot pin 44 extending through the gear shifting lever 26 and through the two prongs of the bifurcated front part 43 of the pawl bar 42. The rear end portion 45 of the pawl bar 42 is bent downwardly and is located between the upwardly projecting flanges of a channel shaped upper pawl 46. A pivot pin 47 extends through the rear end portion 45 of the pawl bar 42 and through the flanges of the upper pawl 46 securing said pawl pivotally to the pawl bar. The upper edges of the pawl flanges are beveled to incline forwardly as at 48 and a helical spring 49 is arranged between the pawl flanges and abuts with its upper end against the lower surface of the pawl bar 42 and its lower end abuts the upper surface of the web of the pawl 46. On the under side of the pawl bar 42 a retainer pin 50 is arranged extending into the upper end portion of the spring 49 and on the upper side of the web of the pawl 46 another retainer pin 51 is provided projecting into the lower end portion of said spring, which is held thereby in position forwardly of the pivot pin 47. The pawl 46 is located above the ratchet portion of the gear shifting bar B and is pivoted into contact therewith by the pressure of the helical spring 49, the beveled front pawl portion being urged into engagement with the ratchet teeth 18.

A lower pawl bar 52 has a bifurcated front end portion 53, which straddles the lower end portion of the gear shifting lever 26, and a pivot pin 54 extending through the gear shifting lever 26 adjacent its lower end and through the two prongs of the bifurcated pawl bar portion 53 connects the latter pivotally with the gear shift lever. A lower pawl P has a body 55, the rear end portion of which has a slightly downwardly inclined top surface and an upwardly beveled under side as shown at 56 and 57 respectively in Figure 3. A vertical central slot 58 extends rearwardly from the front end of the pawl body 55 and the rear end portion 59 of the lower pawl bar 52 is located in this slot. A pivot pin 60 extends through the rear pawl bar portion 59 and the front end portion of the lower pawl body 55 and connects these two parts pivotally with each other. A lug 61 is formed on the under side of the pawl body 55 and extends downwardly therefrom. A stop block 62 is formed on the under side of the pawl bar 52 and projects downwardly therefrom at a comparatively short distance from the rear end of said bar. A helical spring 63 is located between the lug 61 and the stop block 62. The rear end portion of said spring is inserted in a blind hole 64 in the front surface of the lug 61 and a retainer pin 65 provided on the rear surface of the stop block 62 projects into the front end portion of the spring to secure it in working position. In each of the walls 20 and 21 of the outer casing C two horizontal guide channels 66 of U-shaped cross section, are inserted and secured to the walls in any preferred conventional manner, so that the flanges 67 of the channels 66 have their longitudinal edges flush with the inside of the walls 20 and 21 of the casing C. The pivot pins 47 and 60 of the upper and lower pawls 46 and P respectively extend both ways beyond the respective pawls and the guide channels 66 are arranged so that the projecting end portions 68 and 69 of the pivot pins 47 and 60 respectively extend slidably into the guide way formed by said channels. The distance between the two sets of guide channels 66 is such that the upper pawl 46 is adapted to engage the upper ratchet teeth under the pressure of the spring 49 and that the lower pawl P is adapted to engage the lower ratchet teeth 19 under the pressure of the spring 63. A stop pin 70 is set into the upper pawl 46 adjacent its rear end and extends outwardly therefrom into an opening 71 provided in the outside wall 20 of the casing C and a similar stop pin 72 is set into the lower pawl body 55 approximately at the base of its beveled rear end portion. The second stop pin 72 extends outwardly from the pawl into the opening 71. This opening is of such size that it permits the free full up and down and lengthwise movements of the pins 70 and 72, imparted to them by the pawls 46 and 55, respectively during their pivotal movements about the pivot pins 47 and 60 respectively and during their lengthwise movements while engaging or actuating the shifting bar B.

On the handle bar 73 a pawl control lever 74 is pivotally mounted intermediate its ends as at 75. The outer end portion of said control lever is formed into a hand lever 76 and a flexible control rod 77 is secured to the inner end portion 78 of the control lever. The control rod extends through and is guided by a flexible tubing 79 fastened to the frame F and other conventional parts of the motorcycle. A plate 80 is slidably secured to the outside wall 20 by means of a metal strap 81 and covers the opening 71 in said wall. A stop plate 82 which fits into the opening 71 so that it can be moved up and down therein, is secured onto the inside surface of the plate 80. The control rod 77 is attached centrally onto the upper edge of the plate 80 and helical spring 83 surrounding the control rod 77 abuts the said upper edge with its lower end. A stop guide 84 is fastened onto the outside wall 20 and permits the control rod 77 to slide through it. The upper end of the helical spring 83 abuts the stop guide 84 so that the plate 80 is urged downwardly, whereby the stop plate 82 is forced into contact with the stop pin 72 in the lower pawl P, swinging it downwardly against the pressure of the spring 63 and disengaging the pawl from the lower ratchet teeth 19.

The above described mechanism operates as follows: The operator is in starting position, the gear shifting bar 16 is in first speed position and the front pedal 35 is held down by foot pressure holding the clutch in inoperative position. The pedal 35 is released and the rear pedal 33 is pressed downwardly so that the lever bar L is pivoted in clockwise direction and the front pedal is moved upwardly. During the initial movement of the lever bar L, the lever arm 29 is released to pivot in clockwise direction under the pressure of the spring 40, so that the upper portion of the gear shift lever 26 is pivoted rearwardly placing the upper pawl 46 in position to engage the second upper ratchet tooth 18. The lower pawl P is pivoted downwardly out of engagement with the lower ratchet teeth by the stop plate 82, which is forced downwardly by the control spring 83, so that it engages the stop pin 72 in the lower pawl. The further movement of the lever bar L in clockwise direction urges the clutch operating rod 37 rearwardly throwing the clutch in. The downward movement of the rear pedal 33 is limited by a stop 85 provided on and projecting outwardly from the lower portion of the gear shift lever 26. To shift the gears into second speed the front pedal 35 is pressed downwardly, whereby the clutch operating rod 37 is pulled forwardly disengaging the clutch. Then the lever bar L engages the pin 41, so that the lever arm is pivoted downwardly and the upper portion of the gear shift lever is swung forwardly pulling the upper pawl 46 and the gear shift bar 16 engaged thereby forwardly. When the gears are in mesh, the rear pedal 33 is pressed downwardly, releasing the lever arm 29 again to be pivoted upwardly by the spring 40 and placing the upper pawl 46 in position to engage the third upper ratchet tooth 18. Then the clutch operating rod 37 is urged rearwardly throwing the clutch in.

These operations may be repeated until the desired speed is obtained. When the speed is to be reduced the hand lever portion 76 of the control lever 74 is forced toward the handle bar 73 to lifting the control rod 77 and the plates 80 and 82 and compressing the spring 83. The stop plate 82 engages the stop pin 79 and lifts it and the upper pawl 46 upwardly disengaging the latter from the upper ratchet teeth 18. At the same time, the downward pressure of the stop plate 82 on the stop pin 72 is removed, so that the spring 63 can pivot the lower pawl P into position to engage the lower ratchet teeth 19. When the front pedal 35 is forced downwardly, the clutch is disconnected as described above, and then the lower portion of the gear shift lever 26 is pivoted rearwardly, so that the gear shift bar 16 is slid rearwardly by the pawl P. This operation can be repeated until the desired reduction of speed is obtained.

Whenever it is desired to stop, the front pedal 35 is depressed completely so that the clutch is disconnected. The pedal 35 will remain in this position since the pivot pin 36 on the lever bar L and the shaft 38 are arranged so that they will be approximately two degrees beyond the dead center with respect to the connection of the operating rod with the clutch lever 32.

The above described mechanism is substantially enclosed in the outer casing C. A bracket 85 is secured to or formed on the lower front end portion of the inside wall 21 of the casing C and is provided with a plurality of holes 86 corresponding with holes conventionally provided in frames of standard motorcycles so that the outer casing C is adapted to be mounted on such frames by means of bolts, not shown.

I claim:

1. In a motorcycle having a clutch and a gear shift, means forming a horizontal guide at one side of the motorcycle, a gear shifting bar slidably supported in said guide and having a rear end coupled with the gear shift, a shift lever supported forwardly of said bar for oscillation on a horizontal axis, ratchet teeth formed upon the upper and lower sides of said bar at the forward end thereof, a pair of rearwardly converging arms pivotally coupled with the lever above and below the said axis, respectively, and having the toothed end of said bar between the convergent ends thereof, pawl members each pivoted upon the rear end of an arm for engagement with the adjacent ratchet teeth, spring means urging the pawls toward the adjacent teeth, pedal control means for effecting oscillation of the lever and rectilinear movement of the pawls, one pawl engaging the adjacent teeth upon movement in one direction to shift the bar forwardly, the other pawl engaging the adjacent teeth upon movement in the opposite direction to shift the bar rearwardly, means for maintaining the said other pawl free of connection with the bar when the said one pawl is functioning to effect forward movement of the bar, and means connecting the pedal with the clutch for disengaging the latter upon oscillation of the pedal in a direction to effect shifting of the bar by a pawl.

2. In a motorcycle having a clutch and a gear shift, means forming a horizontal guide at one side of the motorcycle, a gear shifting bar slidably supported in said guide and having a rear end coupled with the gear shift, a shift lever supported forwardly of said bar for oscillation on a horizontal axis, ratchet teeth formed upon the upper and lower sides of said bar at the forward end thereof, a pair of rearwardly converging arms pivotally coupled with the lever above and below the said axis, respectively, and having the toothed end of said bar between the convergent ends thereof, pawl members each pivoted upon the rear end of an arm for engagement with the adjacent ratchet teeth, spring means urging the pawls toward the adjacent teeth, pedal control means for effecting oscillation of the lever and rectilinear movement of the pawls, one pawl engaging the adjacent teeth upon movement in one direction to shift the bar forwardly, the other pawl engaging the adjacent teeth upon movement in the opposite direction to shift the bar rearwardly, a guide means for each pawl for maintaining rectilinear movement of the pawl in a path paralleling the adjacent bar but permitting free swinging movement of the pawl relative to the bar, each of said pawls having a laterally extending pin member, an element mounted between said pin members for selective shifting movement relative to the same and having two operative positions, said element when in either of said operative positions engaging one pin member to maintain the adjacent pawl free of connection with the bar and permitting the other pawl to have operative connection with the ratchet teeth of the bar, means for selectively moving said element into engagement with the pins, and means connecting the pedal with the clutch for disengaging the latter upon oscillation of the pedal in a direction to effect the shifting of the bar by a pawl.

3. Mechanism of the character stated in claim 1, wherein said pedal control means comprises a pedal element supported for oscillation upon the same axis as the shift lever, a lever arm coupled with and extending from the shift lever to swing therewith on said axis, a pin carried by the lever arm and disposed beneath a portion of the pedal to be engaged upon depression of the pedal to transmit the pedal movement to the shift lever, and a spring means connected with said lever arm and normally urging oscillation of the latter and the shift lever in the opposite direction to that imparted by the pedal.

4. In a motorcycle having a clutch and a gear shift, means forming a horizontal guide at one side of the motorcycle, a gear shifting bar slidably supported in said guide and having a rear end coupled with the gear shift, a shift lever supported forwardly of said bar for oscillation on a horizontal axis, ratchet teeth formed upon the upper and lower sides of said bar at the forward end thereof, a pair of rearwardly converging arms pivotally coupled with the lever above and below the said axis, respectively, and having the toothed end of said bar between the convergent ends thereof, pawl members each pivoted upon the rear end of an arm for engagement with the adjacent ratchet teeth, spring means urging the pawls toward the adjacent teeth, pedal control means for effecting oscillation of the lever and rectilinear movement of the pawls, one pawl engaging the adjacent teeth upon movement in one direction to shift the bar forwardly, the other pawl engaging the adjacent teeth upon movement in the opposite direction to shift the bar rearwardly, means for maintaining the said other pawl free of connection with the bar, means connecting the pedal with the clutch for disengaging the latter upon oscillation of the pedal in a direction to effect shifting of the bar by a pawl, a guide means adjacent to each pawl and paralleling the gear shifting bar, a connection between each pawl and the adjacent guide means, and a hand controlled means for releasing the said other pawl for engagement with the adjacent ratchet teeth and for moving the said one pawl to an inoperative position with respect to the adjacent ratchet teeth.

CARL O. ERICKSON.

REFERENCES CITED

The following references are of record in the file of this patent:

UNITED STATES PATENTS

| Number | Name | Date |
| --- | --- | --- |
| 1,167,097 | Myers | Jan. 4, 1916 |
| 1,201,806 | Cook | Oct. 17, 1916 |
| 1,771,608 | Benzing | July 29, 1930 |
| 1,773,216 | Campbell | Aug. 19, 1930 |
| 2,074,797 | Massolo | Mar. 23, 1937 |
| 2,094,163 | Weber | Sept. 28, 1937 |
| 2,498,914 | Correll | Feb. 28, 1950 |

FOREIGN PATENTS

| Number | Country | Date |
| --- | --- | --- |
| 415,817 | Great Britain | Sept. 6, 1934 |